(12) United States Patent
Kerns et al.

(10) Patent No.: US 9,835,429 B2
(45) Date of Patent: Dec. 5, 2017

(54) SHOCK ATTENUATION DEVICE WITH STACKED NONVISCOELASTIC LAYERS

(71) Applicant: Raytheon Company, Waltham, MA (US)

(72) Inventors: Keith A. Kerns, Tucson, AZ (US); Wayne Y. Lee, Tucson, AZ (US); John J. Spilotro, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/918,677

(22) Filed: Oct. 21, 2015

(65) Prior Publication Data

US 2017/0115108 A1    Apr. 27, 2017

(51) Int. Cl.
*F42B 12/02* (2006.01)
*F41H 5/00* (2006.01)
*F42D 5/045* (2006.01)
*F16F 7/12* (2006.01)

(52) U.S. Cl.
CPC ............... *F42D 5/045* (2013.01); *F16F 7/12* (2013.01)

(58) Field of Classification Search
CPC ... F41H 5/02; F41H 5/023; F41H 5/04; F41H 5/0421; F41H 5/428; F41H 5/435; F41H 5/442; F41H 5/457; F41H 5/492; F41H 5/471; F42B 3/22; F42B 12/04; F42B 12/06; F42B 12/10; F42B 12/208
USPC ................. 89/36.02, 903, 904, 917; 102/479
See application file for complete search history.

(56) References Cited

U.S. PATENT DOCUMENTS

| | | | | |
|---|---|---|---|---|
| 351,297 | A * | 10/1886 | Tobin | F41H 5/04 114/12 |
| 3,889,462 | A * | 6/1975 | Beichel | F42B 5/16 102/340 |
| 4,048,365 | A * | 9/1977 | Hoover | B32B 7/02 244/121 |
| 4,061,815 | A * | 12/1977 | Poole, Jr. | B32B 27/12 428/215 |
| 4,179,979 | A * | 12/1979 | Cook | F41H 5/0414 109/49.5 |
| 4,404,889 | A * | 9/1983 | Miguel | F41H 5/0442 428/118 |
| 4,836,084 | A * | 6/1989 | Vogelesang | F41H 5/0414 109/82 |

(Continued)

*Primary Examiner* — Derrick Morgan
(74) *Attorney, Agent, or Firm* — Renner, Otto, Boisselle & Sklar, LLP

(57) ABSTRACT

A shock attenuation device is used to reduce the effect of a blast shock by both disrupting the propagation of the shock and by spreading, deflecting, and/or redirecting the shock. The device includes multiple layers of different materials, having different shock transmission impedances, stacked in a direction in which the blast shock travels through the device. At least one of the layers includes a material that crumples in response to the shock, undergoing an inelastic deformation in response to the shock. Also, at least one of the layers includes a material that has a directional shock transmission impedance that provides different shock transmission impedance within different directions within the material. The directional shock transmission material may be oriented such that the preferred direction of shock transmission within the material is oriented away from the direction of in which the multiple layers of material are stacked.

16 Claims, 6 Drawing Sheets

(56) References Cited

U.S. PATENT DOCUMENTS

| | | | | |
|---|---|---|---|---|
| 4,848,239 A * | 7/1989 | Wilhelm | F42B 12/22 | 102/475 |
| 4,880,681 A * | 11/1989 | Price | C08J 5/04 | 244/117 A |
| 4,911,062 A * | 3/1990 | Heyman | F41H 5/04 | 181/286 |
| 4,934,245 A * | 6/1990 | Musante | F41H 5/04 | 428/328 |
| 4,989,493 A * | 2/1991 | Blommer | F42B 39/24 | 102/374 |
| 5,061,545 A * | 10/1991 | Li | B29C 43/222 | 428/156 |
| 5,114,772 A * | 5/1992 | Vives | C04B 35/80 | 109/80 |
| H001061 H * | 6/1992 | Rozner | F41H 5/0457 | 109/82 |
| 5,190,802 A * | 3/1993 | Pilato | B32B 5/26 | 156/306.6 |
| 5,310,592 A * | 5/1994 | Baker | B32B 5/26 | 244/113 |
| 5,349,893 A * | 9/1994 | Dunn | F41H 5/04 | 2/2.5 |
| 5,456,156 A * | 10/1995 | Semple | F41H 5/0421 | 109/82 |
| 5,698,814 A * | 12/1997 | Parsons | B26F 3/04 | 102/307 |
| 5,804,757 A * | 9/1998 | Wynne | F41H 5/0428 | 2/2.5 |
| 5,834,082 A * | 11/1998 | Day | B29C 44/06 | 428/316.6 |
| 6,030,483 A * | 2/2000 | Wilson | B32B 3/12 | 156/290 |
| 6,112,635 A * | 9/2000 | Cohen | F41H 5/0414 | 428/911 |
| 6,289,781 B1 * | 9/2001 | Cohen | F41H 5/023 | 428/911 |
| 6,418,832 B1 * | 7/2002 | Colvin | F41H 5/04 | 2/2.5 |
| 6,826,996 B2 * | 12/2004 | Strait | F41H 5/0414 | 109/11 |
| 6,895,851 B1 * | 5/2005 | Adams | F41H 5/023 | 428/547 |
| 7,601,654 B2 * | 10/2009 | Bhatnagar | F41H 5/0457 | 181/292 |
| 7,685,922 B1 * | 3/2010 | Martin | F41H 5/0414 | 89/36.01 |
| 7,824,775 B2 * | 11/2010 | Copley | B23K 15/0006 | 219/121.14 |
| 7,914,069 B2 * | 3/2011 | Barbe | F41H 7/042 | 296/193.07 |
| 8,141,471 B2 * | 3/2012 | DeCristofaro | F41H 5/023 | 428/911 |
| 8,225,704 B2 * | 7/2012 | Ogrin | C04B 35/053 | 156/245 |
| 8,701,540 B2 * | 4/2014 | Hunn | B22D 19/00 | 89/36.02 |
| 8,701,544 B2 * | 4/2014 | Peters | F41H 5/06 | 89/36.01 |
| 8,746,122 B1 * | 6/2014 | Roland | F41H 5/04 | 89/36.02 |
| 8,863,634 B1 * | 10/2014 | Lou | F41H 5/0464 | 89/36.02 |
| 9,222,260 B1 * | 12/2015 | Hao | E04C 2/32 | |
| 2002/0088340 A1 * | 7/2002 | Chu | F41H 5/0421 | 89/36.02 |
| 2008/0006146 A1 * | 1/2008 | Magnusson | F41H 5/0492 | 89/36.02 |
| 2008/0105114 A1 * | 5/2008 | Gabrys | B32B 3/18 | 89/36.02 |
| 2009/0136702 A1 * | 5/2009 | Gu | B32B 17/10009 | 428/49 |
| 2009/0167628 A1 * | 7/2009 | Frenkel | H01Q 1/002 | 343/872 |
| 2009/0293709 A1 * | 12/2009 | Joynt | F41H 5/04 | 89/36.02 |
| 2009/0308239 A1 * | 12/2009 | Jones | B32B 17/10009 | 89/36.02 |
| 2010/0043630 A1 * | 2/2010 | Sayre | F41H 5/0421 | 89/36.02 |
| 2010/0282062 A1 * | 11/2010 | Sane | F41H 5/007 | 89/36.02 |
| 2011/0027560 A1 * | 2/2011 | Peters | F41H 5/0435 | 428/215 |
| 2011/0107904 A1 * | 5/2011 | Queheillalt | F41H 5/023 | 89/36.02 |
| 2011/0283873 A1 * | 11/2011 | Wadley | F41H 5/023 | 89/36.02 |
| 2011/0303079 A1 * | 12/2011 | Joynt | F41H 5/023 | 89/36.02 |
| 2012/0017754 A1 * | 1/2012 | Joynt | F41H 5/007 | 89/36.02 |
| 2012/0024138 A1 * | 2/2012 | Carberry | F41H 5/0421 | 89/36.02 |
| 2012/0065294 A1 * | 3/2012 | Gajiwala | B82Y 30/00 | 523/351 |
| 2012/0085224 A1 * | 4/2012 | Jongedijk | B29C 43/003 | 89/36.02 |
| 2012/0090454 A1 * | 4/2012 | Treadway | F41H 5/023 | 89/36.02 |
| 2012/0174751 A1 * | 7/2012 | Holowczak | F41H 5/0428 | 89/36.02 |
| 2012/0174757 A1 * | 7/2012 | Grace | F41H 5/04 | 89/36.02 |
| 2012/0174811 A1 * | 7/2012 | Treadway | F42D 5/045 | 102/315 |
| 2012/0177871 A1 * | 7/2012 | Ramsey | B32B 5/18 | 428/113 |
| 2012/0186424 A1 * | 7/2012 | Tunis | F41H 5/0492 | 89/36.02 |
| 2012/0186427 A1 * | 7/2012 | Adams | F41H 5/0492 | 89/36.02 |
| 2012/0186742 A1 * | 7/2012 | Kang | B32B 5/26 | 156/324 |
| 2012/0234164 A1 * | 9/2012 | Kucherov | F41H 5/0428 | 89/36.02 |
| 2012/0266745 A1 * | 10/2012 | Warren | F41H 5/0414 | 89/36.02 |
| 2013/0084473 A1 * | 4/2013 | Wahlquist | F41H 5/0421 | 429/8 |
| 2013/0228067 A1 * | 9/2013 | McElfresh | F41H 5/0457 | 89/36.02 |
| 2013/0263727 A1 * | 10/2013 | O'Masta | F41H 5/023 | 89/36.02 |
| 2013/0273341 A1 * | 10/2013 | Albertelli | B32B 5/18 | 428/218 |
| 2014/0113086 A1 * | 4/2014 | Greenhill | F41H 1/04 | 428/34.1 |
| 2014/0123844 A1 * | 5/2014 | Kumazawa | F41H 5/0421 | 89/36.02 |
| 2014/0130657 A1 * | 5/2014 | Pilpel | F41H 5/0485 | 89/36.02 |
| 2014/0208930 A1 * | 7/2014 | Phillips | F41H 5/0421 | 89/36.02 |
| 2014/0260933 A1 * | 9/2014 | Ardiff | F41H 5/0464 | 89/36.02 |
| 2014/0318358 A1 * | 10/2014 | Reichert | F41H 5/04 | 89/36.02 |
| 2015/0237929 A1 * | 8/2015 | Greenhill | F41H 1/08 | 428/328 |
| 2016/0102949 A1 * | 4/2016 | Smith | F41H 5/0457 | 89/36.02 |
| 2016/0169633 A1 * | 6/2016 | Xu | F41H 5/04 | 89/36.02 |
| 2016/0298936 A1 * | 10/2016 | Thouless | F41H 1/04 | |

(56) References Cited

U.S. PATENT DOCUMENTS

2016/0363418 A1* 12/2016 Sorensen .............. F41H 5/0492
2017/0030685 A1* 2/2017 Rockenfeller ........ F41H 5/0421

* cited by examiner

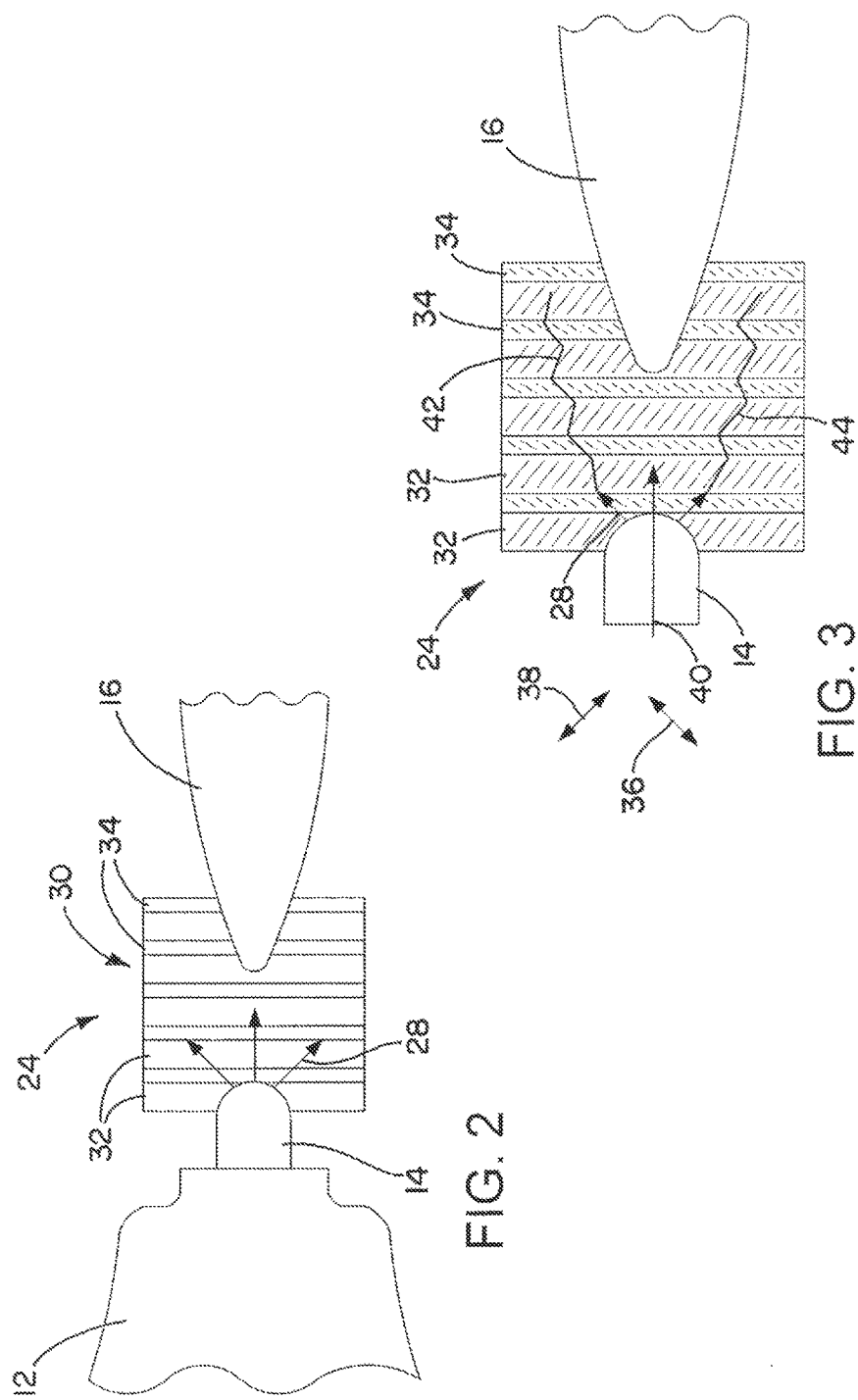

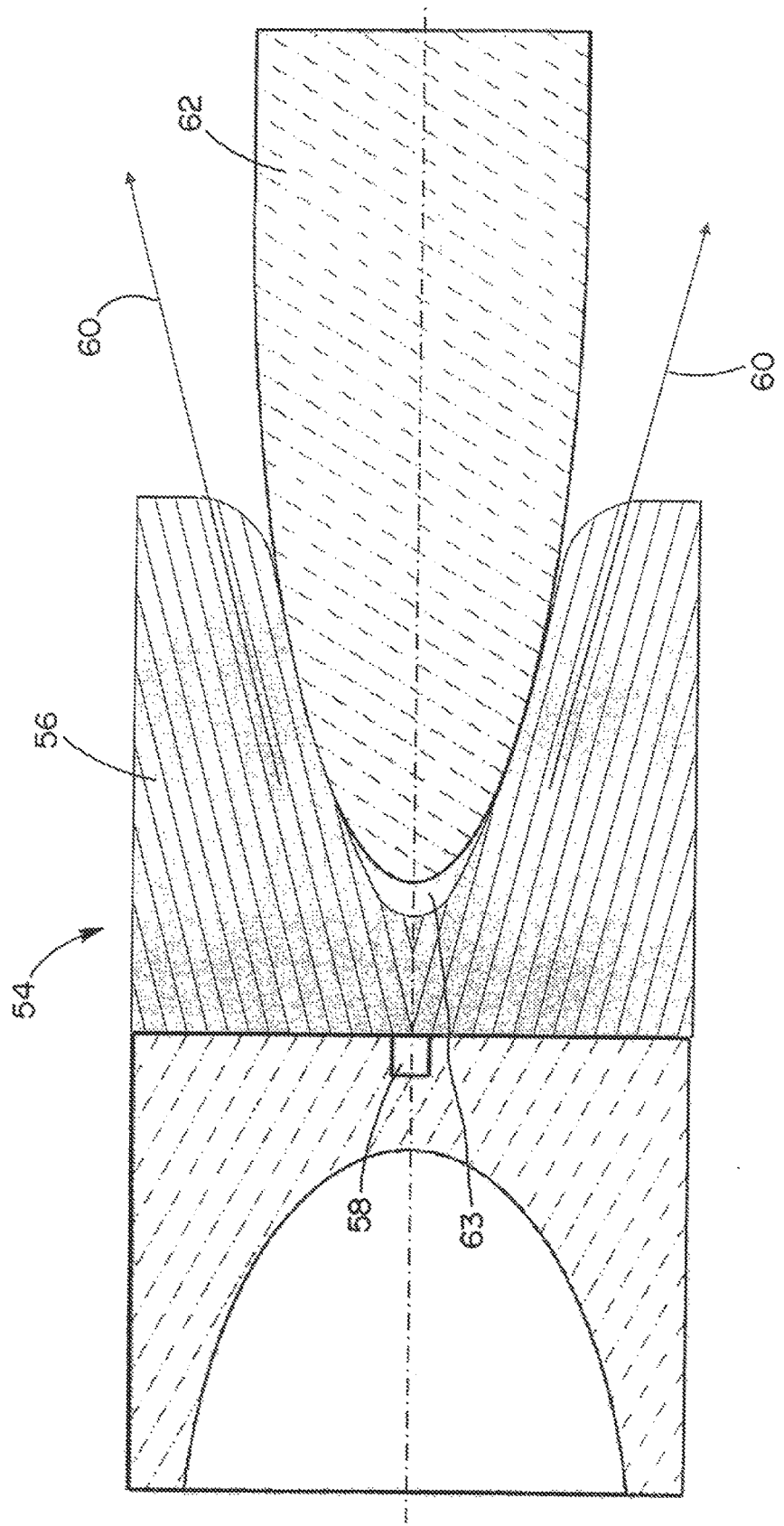

SHOCK ATTENUATION DEVICE WITH STACKED NONVISCOELASTIC LAYERS

FIELD OF THE INVENTION

The invention is in the field of shock attenuation devices, such as devices used to attenuate or deflect directions of the shock from detonation of an explosive.

DESCRIPTION OF THE RELATED ART

Viscoelastic materials such as rubber and other viscoelastic solid materials and syntactic foams have been used as shock absorbing materials. However, particularly for extremely high shock loading rates and/or low temperature cold environments, such materials act more as stiff plastic-like materials, thereby transmitting shocks rather than attenuating them, resulting in their shock attenuation characteristics and ability to either be ineffective or significantly reduced.

SUMMARY OF THE INVENTION

A shock attenuation device includes multiple layers of non-viscoelastic materials stacked one on another.

A shock attenuation device includes multiple layers stacked one on another, at least one of which includes an energy absorbing crushable material.

A shock attenuation device includes multiple layers stacked one on another, at least some of which are porous, having have voids therein.

A shock attenuation device includes multiple layers stacked one on another, at least some of which are discrete pieces of identical, and/or a mixture of different, shapes with same or varying sizes. The pieces may be made of metal, plastic, wood-based materials, paper, or synthetically-derived nano-materials, etc.

A shock attenuation device includes multiple layers stacked one on another, at least some of which are orthotropic or anisotropic materials that include engineered-directional composite materials. The composite materials may include (but are not limited to) continuous/non-continuous/micro/nano fiber reinforced, woven, mesh and/or braided.

A shock attenuation device includes multiple layers stacked one on another, with adjacent layers consist of materials with significant differences in the respective neighboring materials' mechanical impedances, leading to shock attenuation and/or deflection.

A munition includes a shock attenuation device having any combination of features from the other paragraph(s) of this summary.

A shock attenuation device having any combination of features from the other paragraph(s) of this summary is located between a warhead of a munition and a penetrator of the munition, or between a "donor" (high shock source) component and a critically important "receiver" (nearest recipient of the high shock) component that is susceptible to damages induced by the incoming high magnitude and highly impulsive shocks.

According to an aspect of the invention, a shock attenuation device includes: a pair of stacked layers of nonviscoelastic shock-attenuation material in contact with one another; wherein the stacked layers include at least one layer of crushable material; wherein the layers have different shock transmission impedances; and wherein the layers have different directional shock transmission characteristics.

According to an embodiment of the device of any prior paragraph(s), one of the layers has ordered directional shock transmission characteristics that preferentially divert an incipient shock in a first direction.

According to an embodiment of the device of any prior paragraph(s), the other of the layers has non-directional shock transmission characteristics.

According to an embodiment of the device of any prior paragraph(s), the other of the layers has ordered directional shock transmission characteristics that preferentially divert an incipient shock in a second direction that is different than the first direction.

According to an embodiment of the device of any prior paragraph(s), the layers include a third layer, stacked on the pair of stacked layers, that has one or more of a different shock transmission impedance than the shock transmission impedances of the pair of stacked layers, and different directional shock transmission characteristics that the shock transmission characteristics of the pair of stacked layers.

According to an embodiment of the device of any prior paragraph(s), the layers include additional layers on the pair of stacked layers, with the additional layers repeating a pattern set by the pair of stacked layers.

According to an embodiment of the device of any prior paragraph(s), at least one of the layers has voids therein.

According to an embodiment of the device of any prior paragraph(s), the at least one of the layers has pillars of material surrounded by the voids.

According to an embodiment of the device of any prior paragraph(s), at least one of the layers has pillars therein.

According to an embodiment of the device of any prior paragraph(s), one of the layers is a wood layer.

According to an embodiment of the device of any prior paragraph(s), the wood layer has ordered directional shock transmission characteristics.

According to an embodiment of the device of any prior paragraph(s), one of the layers is a composite fiber material layer.

According to an embodiment of the device of any prior paragraph(s), the composite fiber material layer has ordered directional shock transmission characteristics.

According to an embodiment of the device of any prior paragraph(s), one of the layers is a corrugated material layer.

According to an embodiment of the device of any prior paragraph(s), one of the layers is a honeycomb material layer.

According to an embodiment of the device of any prior paragraph(s), one of the layers is a metal layer.

According to an embodiment of the device of any prior paragraph(s), the shock attenuation device is part of a munition.

According to an embodiment of the device of any prior paragraph(s), the shock absorber is located at least in part between a warhead of the munition and a penetrator of the munition, or between a "donor" (high shock source) and a "receiver" (nearest recipient of the incoming high shock) that is critically susceptible to damages induced by the high shock.

According to another aspect of the invention, a method of attenuating a shock includes: attenuating a shock emanating from a shock source by passing the shock through a shock attenuation device that is between the shock source and an object to be shielded from the shock; wherein the attenuating includes passing the shock through stacked layers of the shock attenuation device that have different shock transmission impedances, and that have different directional shock transmission characteristics.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 2 is a magnified view of part of the munition shown in FIG. 1.

FIG. 3 is a side view of a shock attenuation device according to another embodiment of the present invention, showing progress of a shock through directional shock attenuation layers.

FIG. 4A is a side sectional view of a shock attenuation device according to yet another embodiment of the present invention.

DETAILED DESCRIPTION

A shock attenuation device is used to reduce the effect of a blast shock by both disrupting the propagation of the shock and by spreading, deflecting, and/or redirecting the incoming shock away from areas of interest. The device includes multiple layers of different materials, having different shock transmission impedances, stacked in a direction in which the blast shock travels through the device. At least one of the layers includes a material that crumples in response to the shock, undergoing an inelastic deformation in response to the shock. Also, at least one of the layers includes a material that has a directional shock transmission impedance that provides different shock transmission impedances in different directions within the material. The directional shock transmission material may be oriented such that the preferred direction of shock transmission within the material is oriented away from the direction of in which the multiple layers of material are stacked (the direction from the blast shock to the shock attenuation device). The crumplable material may be the same material that has the directional shock transmission impedance, for example being made of wood, a composite material using fibers, or a material with voids therein, such as a honeycomb material. In one specific use, the shock attenuation device may be used within a munition, such as a bomb or a missile, to protect a penetrator element from a blast shock detonated by an explosive warhead of the device, which may for example be a shaped charge.

Figure 1:
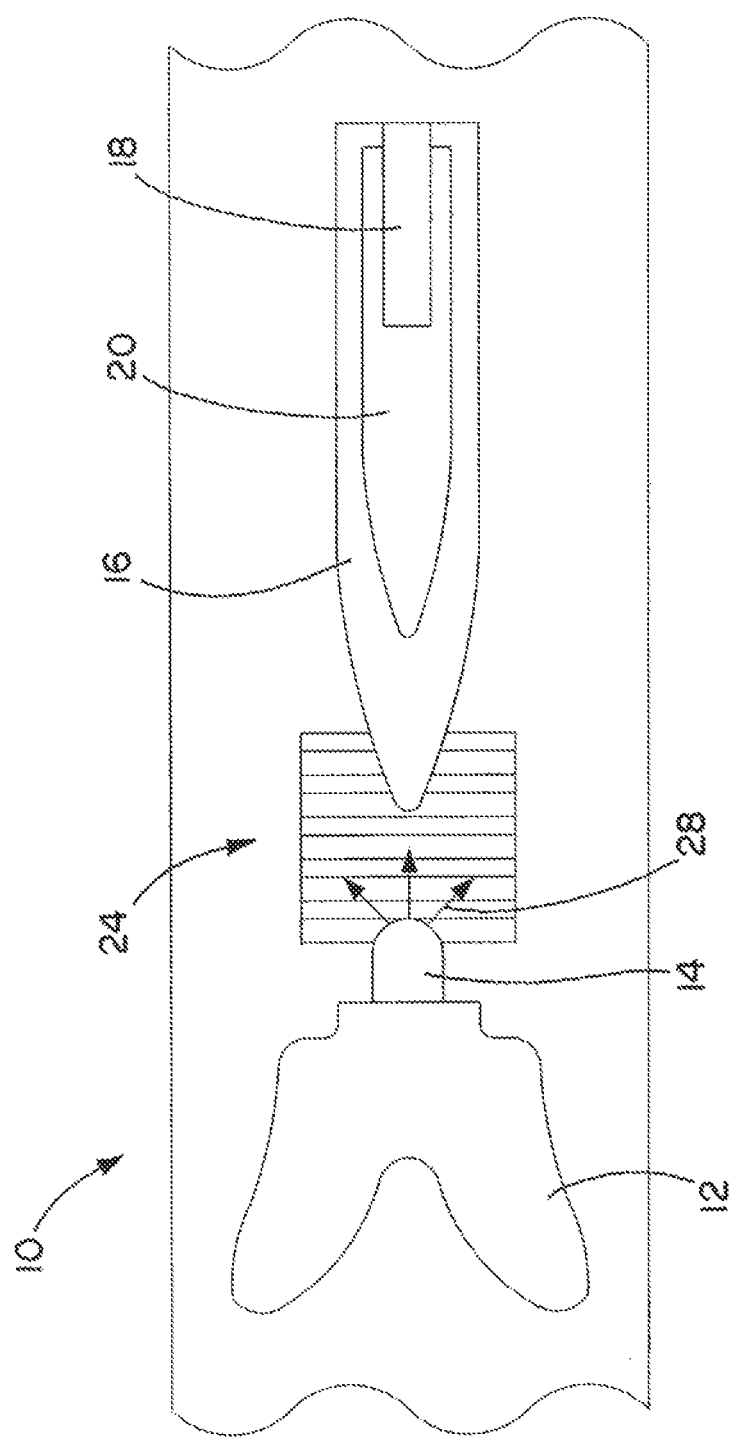
FIG. 1 is a side cross-sectional view of part of a munition that includes a shock attenuation device according to an embodiment of the present invention.

Referring initially to FIG. 1, a munition 10, such as a bomb or a missile, has an explosive warhead 12 that is initiated by a fuze 14, which acts as a shock source. The munition 10 has a penetrator 16 aft of the warhead 12 and the fuze 14. The penetrator 16 also has a fuze 18, for detonating a penetrator explosive 20 within the penetrator 16. A shock attenuating device 24 is located between the explosive warhead 12 and the penetrator 16.

FIG. 1 shows a cross-section of part of the munition 10, which may be axisymmetric, having a roughly cylindrical configuration. The munition may alternatively have other suitable shapes (including non-symmetric shapes) and configurations. The warhead fuze 14 may be a point shock source, or a toroidal shock source, or may have other suitable configurations.

The detonation of the explosive warhead 12 causes a blast shock 28 to radiate rearward through the munition 10. It is desirable that the penetrator 16 be protected from damage from the blast shock 28 to reduce potential risks of sympathetic & pre-mature detonation of the penetrator's payload. Another concern is possible damage to the penetrator fuze 18, which would reduce the effectiveness of the penetrator 16. If the blast shock 28 were to damage the penetrator fuze 18, then the penetrator explosive 20 would not be able to be detonated inside a target, such as a target into which the penetrator 16 had entered, perhaps through a hole made by the explosion of the warhead 12, which may be a shape charge. The shock attenuating device 24 is therefore used to reduce the possible destructive and/or damaging effect of the blast shock 28 on the penetrator 16.

With reference now in addition to FIG. 2, the shock attenuating device 24 includes a series of layers 30 of nonviscoelastic material, stacked one on top of the other. Adjacent of the layers are made of different materials, having different impedances that control the respective shock transmission properties. For example the layers 30 may be a series of alternating first material layers 32, formed of a first nonviscoelastic material, and second material layers 34, formed of a second nonviscoelastic material. The first and second materials have difference shock transmission impedances, corresponding to different speeds of shock propagation in the two materials. This means that there is a discontinuity in impedance at the boundaries between adjacent of the layers 30. This impedance discontinuity can cause a reflection, attenuation, and/or deflection of some of the shock 28 as it encounters a layer boundary, which can weaken the portion of the shock that is not reflected, and moves from layer to layer. The reflections can form a complex pattern that collide against incoming shocks, as they are reflected or pass through other layer boundaries. This spreads out the shock 28 over time and/or distance, weakening the impact of the shock on the penetrator 16.

The materials selected for the layers 30 may be in part selected to produce up to 90% discontinuities in shock transmission impedance. The greater the mechanical impedance differences between adjacent layers, the greater the shock attenuation. This adjustable feature can be modified in accordance with the specific desired level of shock reduction pertinence to each situation.

The layers 30 may be bonded to one another. Alternatively, the layers 30 may be stacked and held together by some other means, mechanically or otherwise. Each layer may also include multiple discrete pieces of materials that are stored within a container designed to hold the discrete pieces of material within that particular layer until shock arrival. Each layer may also consist of a combination of the aforementioned variants of material make-ups.

In addition, at least one of the materials may be a crumplable or crushable material, a material that inelastically deforms in response to the shock 28 passing through the material. Inelastically deforming materials may be used instead of solid viscoelastic or hyperelastic materials, such as rubber or silicon. Viscoelastic or hyperelastic materials may behave as a stiff material when encountered by a sudden shock of large magnitude, transmitting the shock well, rather than blunting its effect. So while viscoelastic materials may perform adequately for slow shock rates and for damping vibrations, they have undesirable characteristics for handling fast shocks such as the blast shock 28. Stiffened viscolelastic materials may also behave similarly to brittle plastics, fracturing more easily and more unpredictably when exposed to high shock loads and/or a cold temperature environment (i.e. less than −29° C. (−20° F.)), which results in poorer and more erratic (unpredictable) performance. Viscoelastic materials may also be degraded with respect to time, temperature, or exposure to ultraviolet (UV) light or to moisture. A non-viscoelastic crumplable or crushable material, in contrast, inelastically deforms, absorbing some of the energy of an incident shock, and are less sensitive to time, temperature, and/or humidity effects. Non-viscoelastic crushable or crumpable materials include, but not limited by, wood-based products (i.e. balsa wood, cork, composite laminated wood products, solid hard wood, solid soft wood etc.); corrugated paper, metal, or plastic; composite sandwiched material (i.e., honeycomb and similar configurations made of metal, wood products, phenolic, paper, air, or other plastic-like materials, high/medium/low density polyethylene [HDPE/MDPE/LDPE], cross-linked polyethylene (PEX), polypropylene, etc.); fiber-reinforced layered composites (i.e. graphites, graphene, fiberglass, Kevlar, nylon, ceramic, epoxy/polyester/phenolic resins, metal matrix etc.); molded plastic and/or composites with a variety of soft and hard mixture of solid constituents; porous materials (i.e. powder metal cast, volcanic rocks, cast metal/wood/plastic based foam with >5% void content); air or soft material filled bubbles; and metal wireballs.

Further, at least one of the materials may have a directional shock transmission impedance that varies in different directions within the material. The material may have fibers or other features that provide preferential transmission of shocks in a certain direction. As explained in greater detail below, the orientation of the directional material may be oriented so as aid in the attenuation of the shock, such as by diverting, spreading, deflecting, and/or redirecting the force of the shock away from an object to be protected from the effects of the shock, such as the penetrator 16.

Many materials may be used for the layers 30. Examples of suitable non-viscoelastic crushable materials include wood, particularly lightweight kinds of wood such as balsa wood; honeycomb composites made of plastics, metals, cardboard, paper, etc.; wood cork; engineered crushable materials; molded composites that are embedded with voids (air pockets) and/or chopped fibers in random orientations; corrugated or porous metallic and/or wood composite materials (e.g., low-density metal sponges with random voids); and stiff-metal wire balls that yield elastically without being traditional springs, which provide a "controlled chaotic" redistribution of shock energy. Non-viscoelastic crushable materials like those described above have performance that is largely independent of temperature, load application rate, storage time, and moisture/humidity. These materials also are resistant to UV exposure, such that they maintain their desired properties for long duration such as long term storage and stowage.

Some of the materials described above, such as wood, honeycomb materials, and certain composite materials containing oriented fibers, have directional shock transmission characteristics. The materials may have a preferred shock transmission direction, the direction in which transmission of is fastest shock transmission (highest impedance) within the material. In wood the shock transmission characteristics of the material may vary based on the direction relative to the grain of the wood. Significantly greater shock transmission occurs along the fiber or grain direction in both fiber composites and wood. As such, fiber or grain orientations in composites and wood used in shock attenuation devices can be placed in directions away from the components being shielded or from the areas of interest. In honeycomb materials the shock transmission would vary based on orientation, with shocks preferentially transmitted along the respective material's "in-plane" directions for both the honeycomb materials (i.e. through thickness of the honeycomb composite), and the top/bottom face sheets (if used). The face sheets' "in-plane" direction is typically perpendicular (or orthogonal) to the "in-plane" directions of the honeycomb's "in-plane" direction, which is in the through thickness direction of the composite. Typically placement of honeycomb for shock attenuation is to have its through thickness direction closest to parallel with the direction of the incoming shocks. Air pockets in honeycombs can be filled with low density porous materials that do not inhibit the buckling of the neighboring honeycomb walls. However, in some cases where there is sufficient depth, honeycomb may be installed with its through-thickness direction perpendicular (or orthogonal) to the direction of the incoming shock. For composite materials with oriented fibers, the preferred direction of shock transmission, the fastest shock transmission (highest impedance) is in the longitudinal fiber direction. As such, fiber composites for greater shock attenuation should be placed in the transverse or through thickness direction.

The layers of material may have any of a variety of suitable thicknesses, which may be dependent on the type or types of material involved. To give examples, a honeycomb material may have a thickness of 12.7 mm (0.5 inches) or more, a balsa wood layer may have a thickness of 3.2 mm (0.13 inches) or more, a fiber composite layer may have a thickness of 2.5 mm (0.1 inches) or more, a corrugated metal layer may have a thickness of 12.7 mm (0.5 inches) or more, and/or a crushable porous foam may have a thickness of 25.4 mm (1 inch) or greater. All of these thicknesses should be considered as non-limiting examples, to give an idea of typical possible thicknesses. In actual practice the layers of various materials may deviate from the values given above.

In placing the oriented material, the preferred direction of shock transmission of the material may be oriented so as to divert shock forces away from a device to be protected (e.g., the penetrator 16), and/or may be oriented to otherwise cause attenuation of the shock. This is illustrated in FIG. 3, where the layers 32 and 34 have preferred shock directions 36 and 38 (directions in which the shock is preferentially transmitted) that are angled away from a central longitudinal axis 40 of the device 24 (which is also an axis of the penetrator 16, as well as the direction in which the layers 32 and 34 are stacked). The preferred directions 36 and 38 are shown as angled so as to have a component in a radial direction, but that is only one example of possible orientations of the preferred directions 36 and 38. The directional orientation of the materials of the layers 32 and 34, the angling of the preferred directions 36 and 38, causes parts of the shock 28 to follow paths such as shown at 42 and 44, diverting those parts of the shock 28 away from the penetrator 16. The orientation of the preferred directions in the layers 32 and 34 may be radial and/or circumferential, to direct the shock in direction(s) away from an object to be protected, and/or to control (encourage) reflection of the shock at the boundary between layers, where there is an impedance mismatch.

Different parts of the layers 32 and 34 may have different orientations to achieve a desired effect. For example, a disk-shaped layer may be divided up into a series of wedges, so that all of the material of the layer may have preferred directions having an outward radial component.

As shown, the orientation direction 36 (for the first layer 32) may be different from the orientation direction 38 (for the second layer 34). Both of the directions 36 and 38 may be different from the direction 40 in which material layers 32 and 34 are stacked. The directions 36 and 38 may be angled relative to the stacking direction 40 in opposite senses. One example is that shown in the illustrated embodiment, where the first direction 36 is sloped upward, and the second direction 38 is sloped downward. Another possibility is one layer having a radially outward component for its directional material, and the other layer having a radially inward component for its directional material. Yet another possibility is for the two layers to have circumferential components in opposite directions for their respective directional material. Various combinations of these possibilities are also possible.

As an alternative, only one of the layers 32 and 34 may be a material with an ordered directional characteristic, while the other material lacks an ordered directional characteristic. A material without an ordered directional characteristic may have substantially uniform shock transmission characteristics at all. Alternatively, a material that has fibers or other direction components placed randomly within it, or placed without deliberate regard to achieving a result of directionally diverting or attenuating a shock, also constitutes a material without an ordered directional characteristic. However a material with fibers placed randomly may be useful for inducing "controlled chaos" in the shock field within the attenuation device as an alternate mode to attenuating shock effects.

Many variations are possible, only a few of which are described below. More than two materials may be used in separate layers, with thicknesses and other characteristics of the layers being the same as or different than those of other of the layers. The layers may repeat in substantially the same form, or may vary in one or more ways in iterations of stacked materials.

Shock transmission characteristics of the materials may change based on location within the shock attenuating device 24. Of most importance are the layers of material between the shock source and the object that is to be protected from the shock.

Figure 4B:
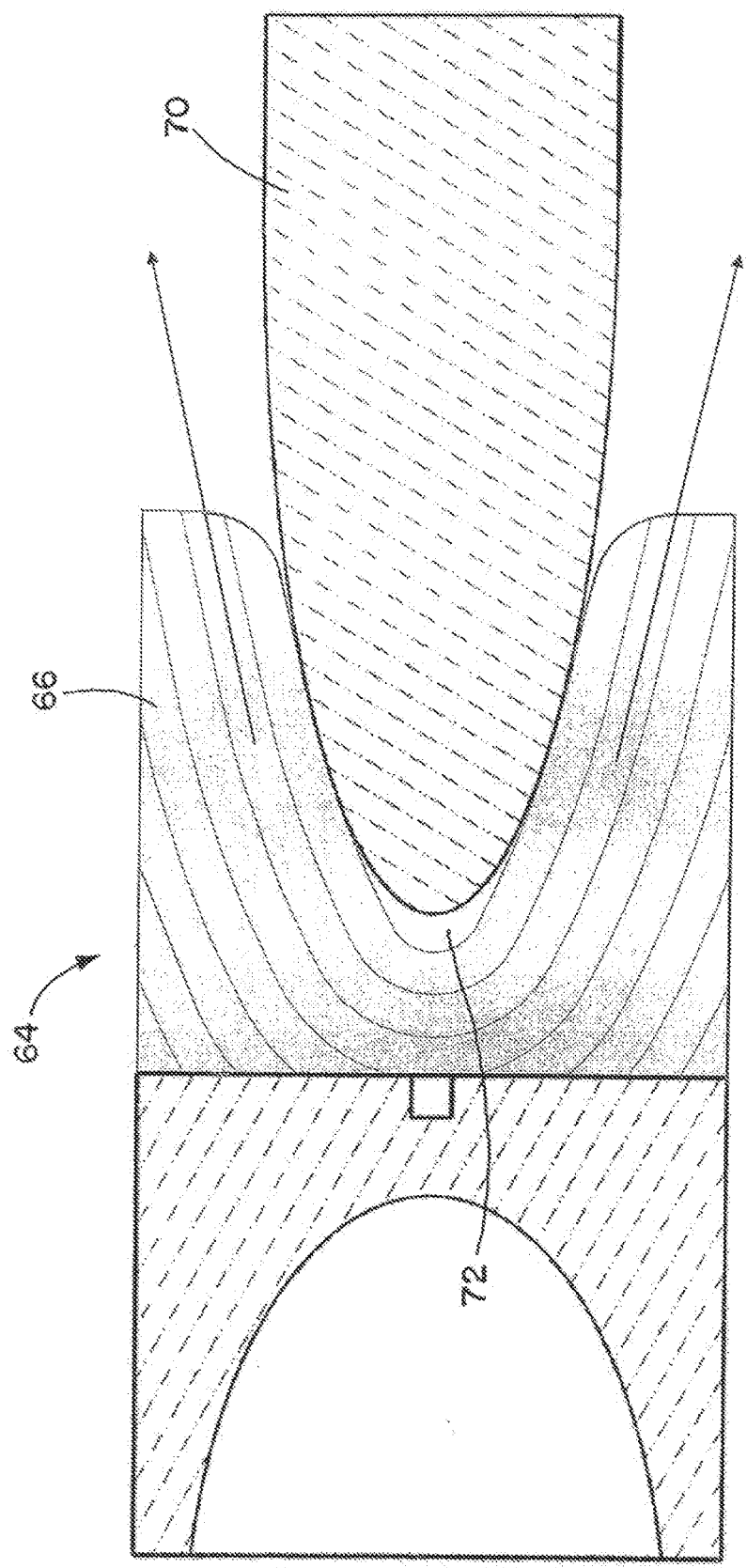
FIG. 4B is a side sectional view of a shock attenuation device according to a further embodiment of the present invention.
Figure 4C:
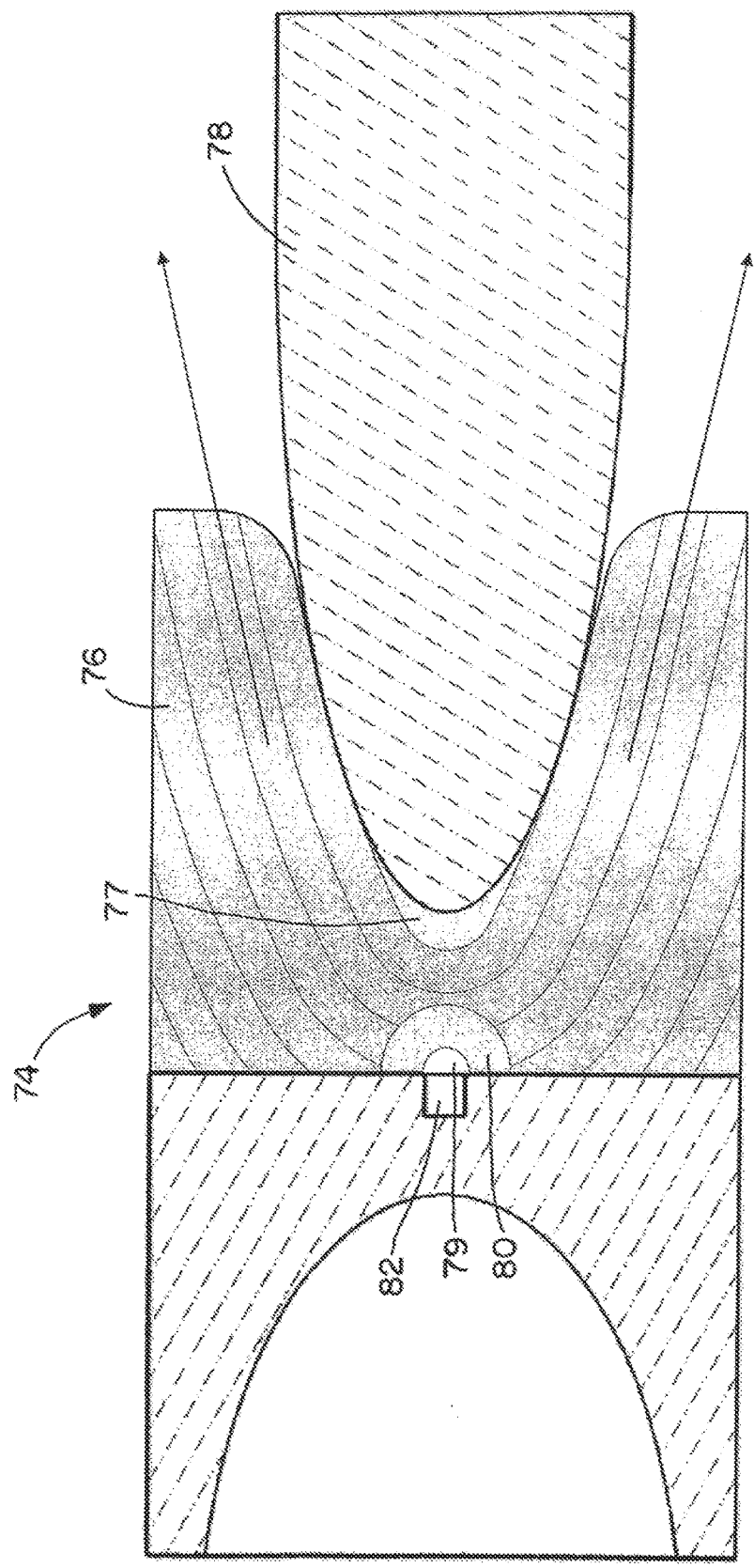
FIG. 4C is a side sectional view of a shock attenuation device according to a still further embodiment of the present invention.

FIGS. 4A, 4B, and 4C show examples of shock attenuation devices which have nonplanar layers. In a shock attenuation device 54 (FIG. 4A) there is an oriented shock transmission material 56 that transmit shocks from a shock source 58 preferentially outward, in directions 60 sloped radially outward, around an object to be protected from the shock, such as a penetrator 62. There may be an air void or another low density material 63 (less dense than the shock transmission material 56) at a nose of the penetrator 62. The location of the low density material 64 may be more broadly described as being at the shortest distance between the shock source 58 and the object to be protected from the shock.

FIG. 4B shows a shock attenuation device 64 having an oriented shock transmission material 66 with curved preferential shock transmission directions around a penetrator 70. Like the device 54 (FIG. 4A), the device 64 may have a relatively low density material 72 at the nose of the penetrator 70.

FIG. 4C shows a shock attenuation device 74 which has an oriented shock transmission material 76 similar to the material 66 (FIG. 4B) of the device 64 (FIG. 4B). In addition to a relatively low density material 77 at a nose of a penetrator 78 (representative of an object to be protected from the shock), the device 74 has a pair of low density materials 79 and 80 in a hollow of the material 76 closest a shock source 82. In one embodiment the low density material 79 closest to the shock source 82 may be air, and the materials 77 and 80 may be made of the same material. However many other arrangements are possible. The various low-density materials 77, 79, and 80 may be interposed between the shock source 82 and the penetrator 78 along the shortest path between the shock source 82 and the penetrator 78. The layers 79 and 80 of low density materials in the forward end of the device 74, adjacent to the shock source 82, are configured to further disrupt the shock flow from the initiation of the shock source 82.

In all of the devices 54, 64, and 74 the oriented shock transmission material may be in a single layer or in multiple layers. The optional void or low density material region directly forward of the penetrators in these embodiments may be any low density solid (i.e. molded porous foam, plastic or metallic component with greater than 5% porosity), or encapsulated low density fluid or gas (i.e. air, nitrogen, helium, or light fluid bubbles), to cite a few examples. Material(s) used in this void can be isotropic, orthotropic and/or anisotropic materials to be adjusted, adapted and applied in accordance with the specified shock attenuation requirements.

The multiple layers in the shock transmission materials 56, 66, and 76 may produce reflection in various directions of a shock entering one side of the device from a shock source, and passing through the shock transmission materials 56, 66, and 76. The curvature of the shock transmission materials 56, 66, and 76 may be in toward the object to be protected from the effects of the shock, shown in the illustrated embodiments as the penetrators 62, 70, and 78. The curvature may help deflect shocks away from the penetrators (or other objects or devices to be protected from the shock). The curvature may interact with various directional characteristics of some or all of the layers to attenuate the shock, cause parts of the shock to reflect and/or cancel out other parts of the shock, and/or divert the shock away from the penetrators. The curved shapes shown FIGS. 4A-4C are only some of the possible configurations of nonplanar shapes. Such shapes may be formed by trimming or by other processes.

The embodiments illustrated in FIGS. 4A-4C show some potential configurations for the shock attenuation device. Additional configurations using any combination of shock dampening features documented in this disclosure may be applied in order to achieve the desired attenuation effects.

Figure 5:
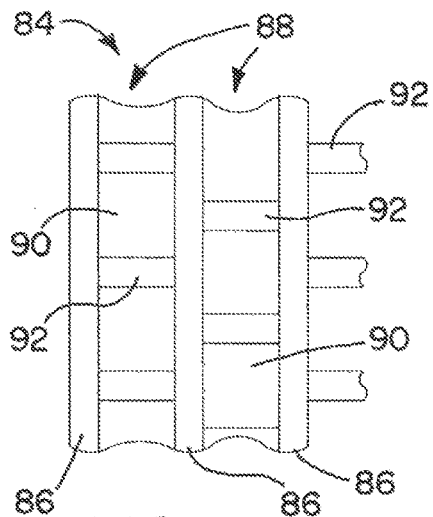
FIG. 5 is a side view of a shock attenuation device according to still another embodiment of the present invention.

FIG. 5 shows another embodiment, in a shock attenuation device 84 that has stacked layers 86 and 88. The layers 86 are made of a continuous non-viscoelastic material, as described above in other embodiments. The layers 88 have a series of voids 90 separating solid material portions 92. The solid material portions 92 may themselves have voids, for example being made of a corrugated or honeycomb material. The voids 90 may be configured to aid in deflecting, diffusing, and/or attenuating a shock that travels into and through the shock attenuation device 84. The impedance mismatch between the air in the voids 90 and the solid material (in the layers 86 and in the portions 92) aids in reflecting some of the energy of the shock, and/or in diffusing some of the energy of the shock by having different parts of the shock experience different propagation speeds. The portions 92 may have only a minimal size, for example being pillars only large enough to structurally support the layers 86 before shock propagation, and may have any of a variety of shapes and sizes.

Figure 6:
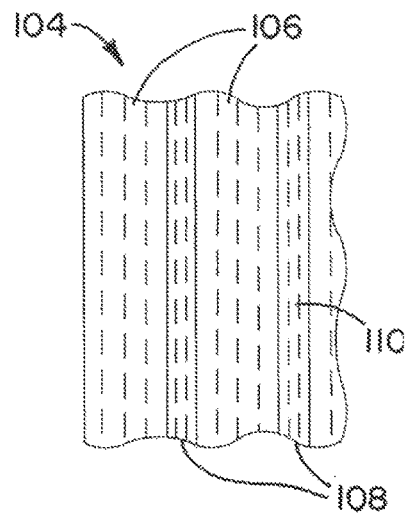
FIG. 6 is a side sectional view of a shock attenuation device according to a further embodiment of the present invention.
Figure 7:
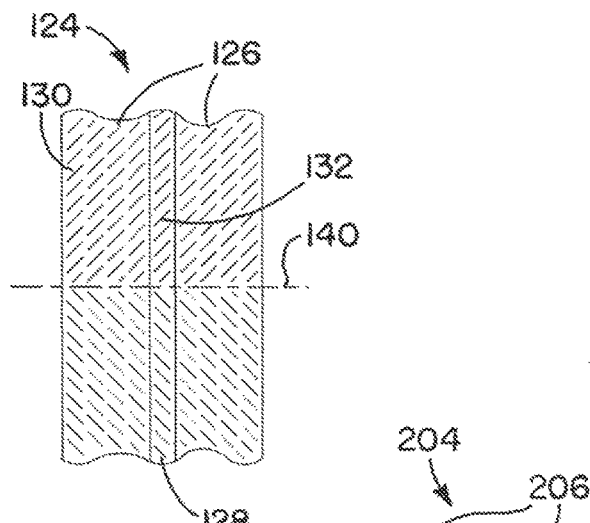
FIG. 7 is a side sectional view of a shock attenuation device according to a still further embodiment of the present invention.

FIGS. 6 and 7 show further variations with regard to directional characteristics of materials. FIG. 6 shows a shock attenuation device 104 having layers 106 and 108. The layers 106 and 108 have fibers or other directional elements 110 oriented in a radial direction. The radial orientation provides for selective propagation of shocks in the radial direction, spreading the shock outward and attenuating it.

FIG. 7 shows a shock attenuation device 124 having layers 126 and 128 with respective fibers 130 and 132 that are canted in a radial direction, away from a central axis 140. The amount of cant may be the same in both the layers 126 and the layers 128, or may be different. The amount of cant may be constant within each layer, or may vary as a function of radial position.

Figure 8:
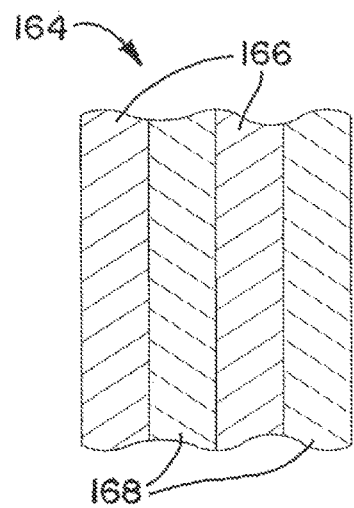
FIG. 8 is a side view of a shock attenuation device according to another embodiment of the present invention.

FIG. 8 shows a further embodiment, in which a shock attenuation device 164 has layers 166 and 168 that are made of a honeycomb or other void-including material. The solid portions of the void-including materials are canted away from a shock-propagation direction 172. The layers 166 and 168 are canted in opposite direction, producing different effects on incipient shocks that diffuse and attenuate such shocks.

Figure 9:
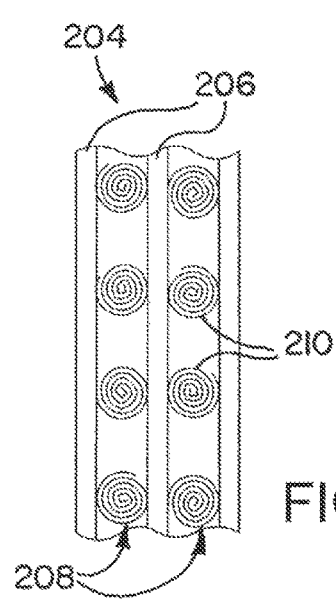
FIG. 9 is a side view of a shock attenuation device according to yet another embodiment of the present invention.

FIG. 9 shows a shock attenuation device 204 having alternating layers 206 and 208 of material. The layers 206 are solid material layers, and the layers 208 are made up of compressible wire balls 210.

The features of the various embodiments described herein may be combined in a single embodiment. For example, any suitable combination of different material layers, having different directional or non-directional characteristics, and/or the use of voids and/or curved layers, may be used in a single shock attenuation device. Some or all layers may have the same or different of these features. The features and the directions of features to be applied in a given stack for shock attenuation may be selected for example upon the direction, magnitude, duration and number of pulses of the input shocks. A high magnitude single-pulse shock applied in the axial direction may indicate a different attenuation layup configuration than a multiple-pulse shock with cylindrical, spherical, toroidal directional shock pattern. In general, the fundamental physics and approach behind the attenuation approach is simple and applies to all cases: disruption of the shock(s) via impedance mismatches, shock reflection, reflection, re-direction, and/or energy absorption through non-viscoelastic crushable materials.

The various shock attenuation devices disclosed herein may be used to attenuate the effects of shocks, even the extremely high shock levels that are present within a munition, from the detonation of a warhead. For example, the shock levels in such a munition may be in excess of 100,000 g, such as around 300,000 g to upward of 600,000+g. The shock attenuation devices may also be used in a wide variety of other types of devices, for instance to munitions subjected to gun launch environments; munition protection against external bullet/shape charge/explosively formed penetrator; and sympathetic detonations due to nearby high magnitude shocks induced by detonations and other highly impulsive, high magnitude and high energy events.

Shock attenuation devices as described above may be used in any of a variety of devices, in addition to being used in munitions, as is shown in some of the embodiments. While the shock attenuation discussion above has been focused on blast shock protection for penetrators and warheads, such devices may also be configured to protect armored vehicles, bunkers, munition storage units, warfighters' modular man-rated berthing units, etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A munition comprising:
   a shock attenuation device that includes a pair of stacked layers of non-viscoelastic shock-attenuation material in contact with one another;
   wherein the stacked layers include at least one layer of crushable material;
   wherein the layers have different shock transmission impedances; and
   wherein the layers have different directional shock transmission characteristics;
   wherein the shock attenuation device is located at least in part between a warhead of the munition and a penetrator of the munition; and
   wherein the layers divert around the penetrator an incipient shock from detonation of the warhead.

2. The munition of claim 1, wherein one of the layers has ordered directional shock transmission characteristics that divert an incipient shock in a first direction.

3. The munition of claim 2, wherein the other of the layers has non-directional shock transmission characteristics.

4. The munition of claim 2, wherein the other of the layers has ordered directional shock transmission characteristics that divert an incipient shock in a second direction that is different than the first direction.

5. The munition of claim 1, wherein the layers include a third layer, stacked on the pair of stacked layers, that has one or more of a different shock transmission impedance than the shock transmission impedances of the pair of stacked layers, and different directional shock transmission characteristics that the shock transmission characteristics of the pair of stacked layers.

6. The munition of claim 1, wherein the layers include additional layers on the pair of stacked layers, with the additional layers repeating a pattern set by the pair of stacked layers.

7. The munition of claim 1, wherein at least one of the layers has voids therein.

8. The munition of claim 7, wherein the at least one of the layers has pillars of material surrounded by the voids.

9. The munition of claim 1, wherein at least one of the layers has pillars therein.

10. The munition of claim 1, wherein one of the layers is a wood layer.

11. The munition of claim 10, wherein the wood layer has ordered directional shock transmission characteristics.

12. The munition of claim 1, wherein one of the layers is a composite fiber material layer.

13. The munition of claim 12, wherein the composite fiber material layer has ordered directional shock transmission characteristics.

14. The munition of claim 1, wherein one of the layers is a corrugated material layer.

15. The munition of claim 1, wherein one of the layers is a honeycomb material layer.

16. The munition of claim 1, wherein one of the layers is a metal layer.

* * * * *